(12) United States Patent
Lee et al.

(10) Patent No.: US 7,395,426 B2
(45) Date of Patent: Jul. 1, 2008

(54) METHOD OF AUTHENTICATING CONTENT PROVIDER AND ASSURING CONTENT INTEGRITY

(75) Inventors: Byung-rae Lee, Yongin-si (KR); Kyung-ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 10/829,340

(22) Filed: Apr. 22, 2004

(65) Prior Publication Data

US 2004/0255114 A1 Dec. 16, 2004

(30) Foreign Application Priority Data

May 7, 2003 (KR) .................. 10-2003-0029144

(51) Int. Cl.
*G06F 1/24* (2006.01)
(52) U.S. Cl. .................. 713/168; 713/176; 713/180
(58) Field of Classification Search .............. 713/168, 713/176, 180
See application file for complete search history.

(56) References Cited

FOREIGN PATENT DOCUMENTS

| CN | 1346105 | | 4/2002 |
|---|---|---|---|
| CN | 1351308 | | 5/2002 |
| CN | 1369809 | A | 9/2002 |
| CN | 1378755 | | 11/2002 |
| JP | 2002-077137 | A | 3/2002 |
| JP | 2002-141895 | A | 5/2002 |
| JP | 2002-169719 | A | 6/2002 |
| JP | 2003-022402 | A | 1/2003 |
| KR | 10-1999-0053174 | | 7/1999 |
| KR | 2001-50111 | A | 6/2001 |
| KR | 2002-0003380 | A | 1/2002 |
| KR | 2002-29802 | A | 4/2002 |
| KR | 2002-0064469 | A | 8/2002 |
| KR | 2003-0007773 | A | 1/2003 |
| WO | WO 00/63903 | A2 | 10/2000 |

OTHER PUBLICATIONS

Aski Co., Ltd., "Encapsulation and Access Control of Content," Unix Magazine, vol. 15-9, Sep. 1, 2000, pp. 158-166 CSDB No.: Local Tech. Magazine 2002-01322-007.

*Primary Examiner*—Thomas R. Peeso
(74) *Attorney, Agent, or Firm*—Sughrue Mion, PLLC

(57) ABSTRACT

A method of authenticating a content provider and assuring content integrity by which the content provider is authenticated and the content integrity is assured upon download, exchange or transfer of a variety of multimedia contents through a wired/wireless communication network. The method of authenticating the content provider and assuring the content integrity, including downloading packaged contents with an electronic signature made thereto into a device of a user through a wired/wireless communication network, finding a URL address from which a certificate for verification of a signature of the content provider is provided, in a header of the contents, acquiring the certificate of the content provider after moving to the URL address, extracting a public key required for the verification of the electronic signature from the acquired certificate, and verifying the electronic signature by using the extracted public key.

8 Claims, 3 Drawing Sheets

METHOD OF AUTHENTICATING CONTENT PROVIDER AND ASSURING CONTENT INTEGRITY

BACKGROUND

This application claims the priority of Korean Patent Application No. 10-2003-0029144 filed on May 7, 2003 in the Korean Intellectual Property Office, the disclosure of which is incorporated herein in its entirety by reference.

1. Field of the Invention

The present invention relates to a method of authenticating a content provider and assuring content integrity, and more particularly, to a method of authenticating a content provider and assuring content integrity by which the content provider is authenticated and content integrity is assured upon download, exchange, or transfer of a variety of multimedia contents through a wired/wireless communication network.

2. Description of the Related Art

Recently, a variety of contents are distributed through wired/wireless communication networks, and development of a variety of techniques has been actively made to protect the copyrights of digital contents. A typical technique includes Digital Rights Management (DRM), for example, which encompasses DRM and Open Mobile Alliance (OMA) DRM v1.0 of Microsoft Corporation.

In a case where a user utilizing a device with the DRM function downloads packaged contents, sends such contents to a device of another user, or freely exchanges and sends them through a bulletin board or by e-mail via a wired/wireless communication network, there is a technique to assure the integrity of the contents sent.

FIG. 1 shows the configuration of conventional packaged contents 1. The contents 1 comprises an encrypted content portion 2, a header 3 including a variety of information on the relevant contents, and an electronic signature 4 made through hash coding of the header 3 of the contents 1. As shown in FIG. 1, the content portion 2 is encrypted and the header 3 includes the content provider's (CP's) name, a content ID, meta-information, the license provider's URL and the like. Here, a hash function is generally utilized in the electronic signature 4. The hash function can be described as a computationally effective function that performs mapping of an arbitrary-size binary string to a fixed-size binary string that is called a hash value. Such a hash function can be used to ensure data integrity in addition to its use for the electronic signature 4.

For example, when the contents 1 including the electronic signature 4, made through the beforehand hash coding of the header 3 of the contents 1, are downloaded, a hash function is then applied to the contents 1 and the electronic signature 4 is compared with a public key provided by the content provider so as to verify the electronic signature.

In such a case where a user downloads the packaged contents 1 from a content provider or receives them from another user through a wired/wireless communication network, the encrypted content portion 2 is transmitted together with the header 3 having the electronic signature 4 made through the beforehand hash coding of the header 3. Thus, the integrity of the packaged contents 1 is assured.

However, according to such related art, the electronic signature 4 is made through the hash coding of only the header 3. Thus, there is a problem in that the integrity of mutual connectivity of the encrypted content portion 2 and the header 3 cannot be assured.

Further, there are problems in that it is impossible to authenticate whether the received contents 1 were prepared by a legitimate content provider, and in that there is no way to acquire a public key certificate of a content provider required for verifying the integrity of the packaged contents 1.

SUMMARY

The present invention is conceived to solve the aforementioned problems in the prior art. An aspect of the present invention is to provide a method of authenticating a content provider and assuring content integrity, wherein a header of contents comprises a uniform resource locator (URL) address enabling acquisition of a certificate of the content provider so as to acquire the certificate of the content provider, thereby verifying an electronic signature.

Consistent with an aspect of the present invention for achieving the object, there is provided a packaged content structure for authenticating a content provider and assuring content integrity, comprising an encrypted content portion and a header comprising an address from which a certificate of the content provider can be acquired.

Consistent with another aspect of the present invention, there is provided a method of authenticating a content provider and assuring content integrity, comprising downloading packaged contents with an electronic signature made thereto into a device of a user through a wired/wireless communication network, finding a URL address from which a certificate for verification of the signature of the content provider is provided, in a header of the contents, acquiring the certificate of the content provider after moving to the URL address, extracting a public key required for verification of the electronic signature from the acquired certificate, and verifying the electronic signature by using the extracted public key.

BRIEF DESCRIPTION OF THE DRAWINGS

The above and other aspects, features and advantages of the present invention will become apparent from the following description of an exemplary embodiment given in conjunction with the accompanying drawings, in which.

DETAILED DESCRIPTION OF THE INVENTION

Hereinafter, an exemplary embodiment of the present invention will be described in detail in view of its object and constitution with reference to the accompanying drawings.

Figure 1:
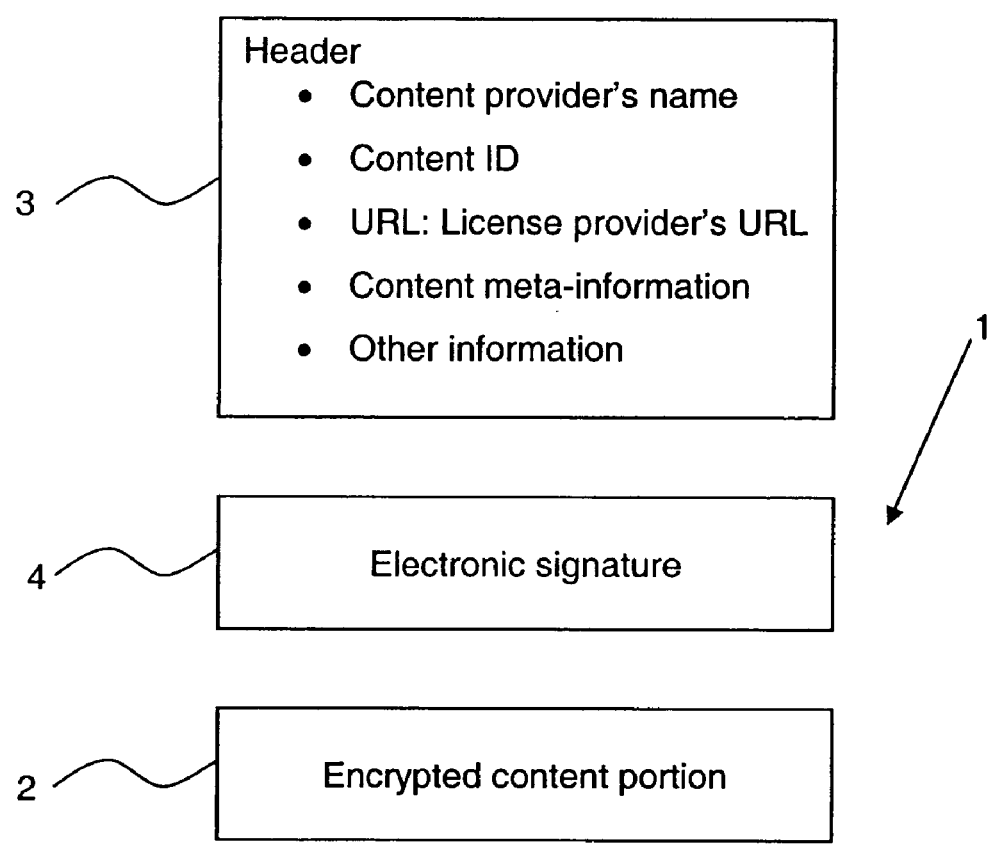
FIG. 1 is a view showing the configuration of conventional packaged contents.
Figure 2:
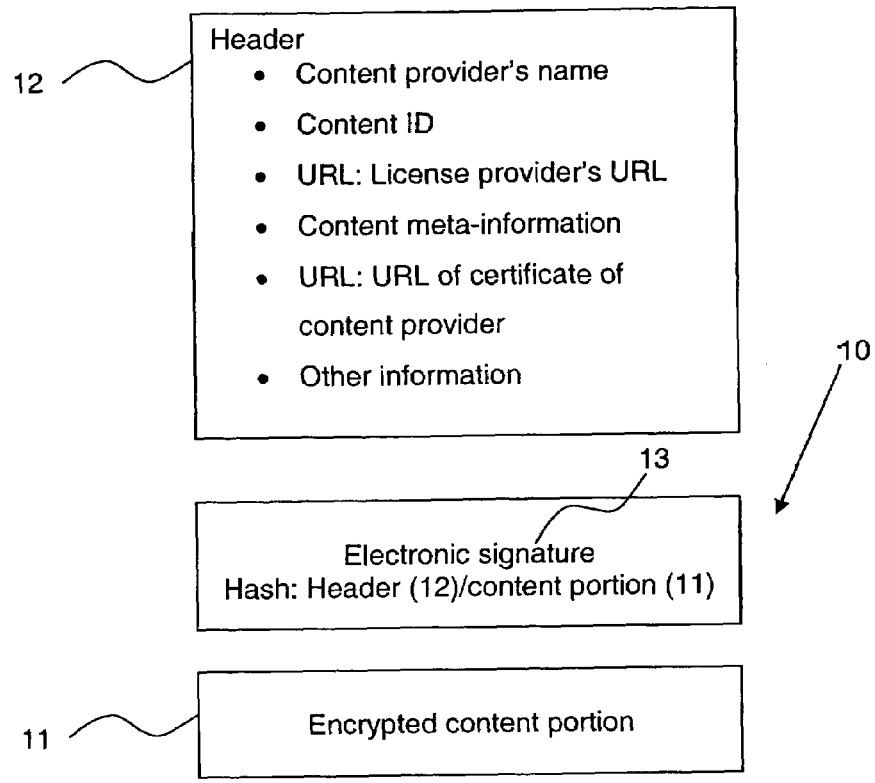
FIG. 2 is a view showing the configuration of packaged contents consistent with the present invention.

FIG. 2 is a view showing the configuration of packaged contents 10 consistent with the present invention. As shown in FIG. 2, the contents 10 comprises an encrypted content portion 11, a header 12 including an address enabling acquisition of a certificate of a content provider 20 (see FIG. 3) and a variety of information on the relevant contents, and an electronic signature 13 for assuring the integrity of the contents.

The header 12 includes the name of the content provider (CP) 20 distributing the contents to users, a content ID, a license provider's URL, meta-information, a URL address enabling the acquisition of the certificate of the content provider 20, and the like. Here, the header is characterized by the URL address providing the certificate of the content provider 20. The certificate of the content provider 20 can be acquired through the URL address, so that it is possible to verify whether the content provider 20 is the same provider that has provided the relevant contents.

To assure the integrity of the packaged contents 10 and to authenticate the content provider 20, the content provider 20 inserts the electronic signature 13 made through hash coding of the header 12 and the encrypted content portion 11 into the packaged contents 10. If it is difficult to make the electronic signature 13 through the hash coding due to the large size of the encrypted content portion 11, only a portion of the encrypted content portion 11 is hash coded and then used together with the header 12 to make the electronic signature.

Figure 3:
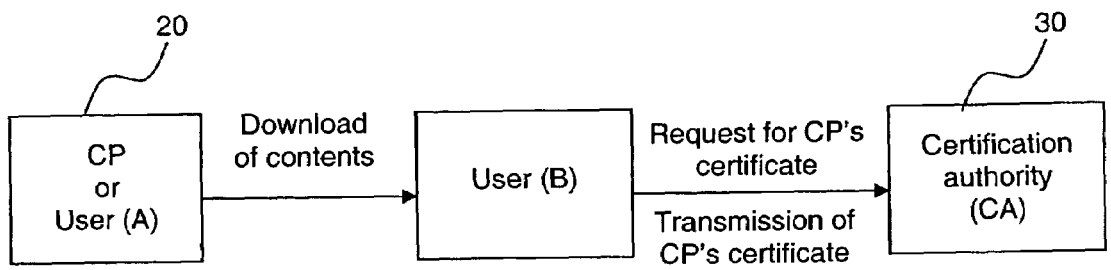
FIG. 3 is a block diagram showing the process of authenticating a content provider consistent with the present invention.

FIG. 3 is a block diagram showing the process of acquiring the certificate of the content provider 20 by using information of the header 12 of the packaged contents 10.

The content provider 20 performs the hash coding of the header 12 and the encrypted content portion 11, inserts the resultant electronic signature 13 into the packaged contents 10, and provides a public key (not shown) required for verification of the electronic signature 13 to the certificate received beforehand from a relevant certification authority (CA) 30. When a user B downloads the contents 10 from the content provider (CP) 20 or a user A, the user acquires the certificate of the content provider 20 by using the URL address from which the certificate of the content provider 20 is provided, and extracts the public key. Then, the electronic signature 13 is verified by comparing the value of the public key with a hash value obtained through the hash coding of the contents 10. Thus, authentication of the content provider 20 can be made and the integrity of the contents 10 can be assured.

Figure 4:
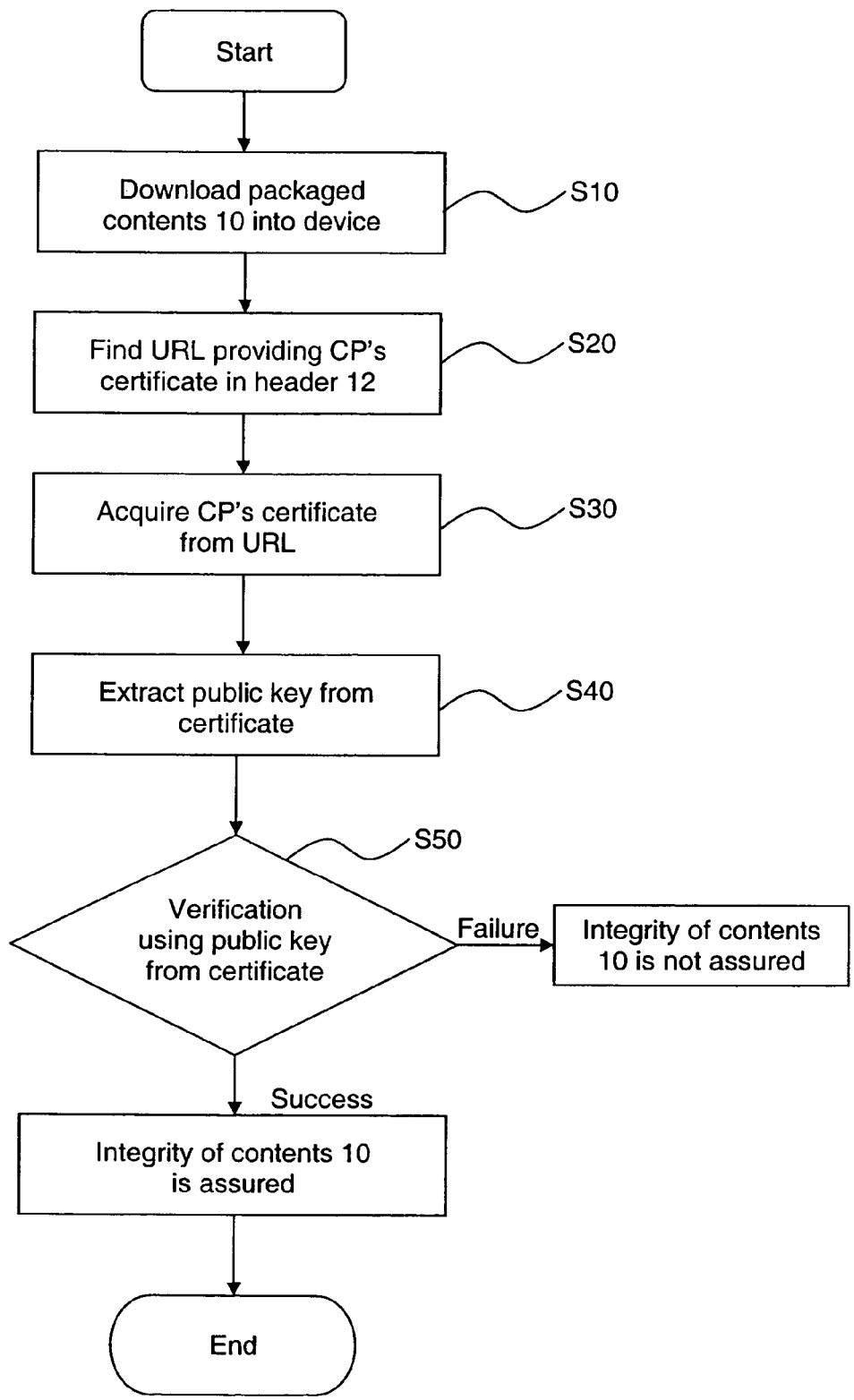
FIG. 4 is a flowchart illustrating a method of authenticating a content provider and assuring content integrity consistent with the present invention.

FIG. 4 is a flowchart illustrating the method of authenticating the content provider 20 and assuring content integrity, which is performed through a wired/wireless communication network in a device with a DRM function. Here, to exchange and transfer a variety of multimedia contents through an existing communication network, the content provider 20 generally has its own certificate, which has been already certificated as an electronic signature by the certification authority 30, and has beforehand used the public key in verifying the certificate of the content provider 20. In this case, how a user verifies the packaged contents 10 will be described.

First, the packaged contents to which the electronic signature is made through the hash coding of the header and the encrypted content portion are downloaded into the user's device via the wired/wireless communication network (S10).

Then, the URL address from which the certificate of the content provider 20 for verifying the signature is provided is found in the header 12 of the downloaded contents 10 (S20).

After the URL address is found, movement to the URL address is made to acquire the certificate of the content provider 20 (S30).

Next, the public key required for verification of the electronic signature 13 is extracted from the acquired certificate of the content provider 20 (S40).

Then, the electronic signature is verified by using the extracted public key (S50).

If the verification is successfully made in the verification step (550), the integrity of the mutual connectivity of the header 12 and the encrypted content portion 11 is assured and the content provider 20 is authenticated as a legitimate content provider.

The step of verifying the electronic signature 13 may comprise applying a hash function to the packaged contents 10 and performing a comparison with the electronic signature 13.

Further, the electronic signature 13 is made through the hash coding of the header 12 and the encrypted content portion 11 and then inserted into the contents 10. In this case, all or some of the encrypted content portion 11 may be hash coded.

A hash value obtained by applying the hash function to the contents 10 is compared with the value of the extracted public key to verify the electronic signature.

As described above, the certificate of the content provider 20 is acquired by referring to the header 12 of the packaged contents 10 and then used for verifying the electronic signature 13. Thus, the integrity of the contents 10 can be verified and the content provider 20 can be authenticated.

Consistent with the present invention, a content receiver can confirm receipt of the contents by verifying the integrity that assures the connectivity of the header and the encrypted content portion. Further, there are advantages in that authentication can be made that the contents were provided by a legitimate content provider, and in that the integrity of the contents can be verified by verifying the electronic signature based on the hash value of the packaged contents.

Although the present invention has been described in detail in connection with an exemplary embodiment of the present invention, it will be apparent to those skilled in the art that various changes and modifications can be made thereto without departing from the spirit and scope of the invention defined by the appended claims. Thus, various modifications to the exemplary embodiment of the present invention fall within the scope of the present invention.

What is claimed is:

1. A packaged content structure for authenticating a content provider and assuring content integrity, comprising:
   an encrypted content portion; and
   a header comprising an address from which a certificate of the content provider can be acquired.

2. The structure as claimed in claim 1, further comprising an electronic signature made through hash coding of predetermined parts of the header and encrypted content portion so as to assure the integrity of the packaged contents.

3. The structure as claimed in claim 2, wherein only some of the encrypted content portion are hash coded and then included in the electronic signature.

4. The structure as claimed in claim 1, wherein the header comprises a content provider's name, a content ID, a license provider's URL, and meta-information.

5. A method of authenticating a content provider and assuring content integrity, comprising:
   downloading packaged contents with an electronic signature made thereto into a device of a user through a wired/wireless communication network;
   finding a URL address from which a certificate for verification of the signature of the content provider is provided, in a header of the contents;
   acquiring the certificate of the content provider after moving to the URL address;
   extracting a public key required for verification of the electronic signature from the acquired certificate; and
   verifying the electronic signature by using the extracted public key.

6. The method as claimed in claim 5, wherein the step of verifying the electronic signature comprises applying a hash function to the packaged contents and performing a comparison with the electronic signature.

7. The method as claimed in claim 5, wherein the electronic signature is made through hash coding of the header and the encrypted content portion and then inserted into the contents.

8. The method as claimed in claim 7, wherein the electronic signature is made through hash coding of only some of the encrypted content portion and then inserted into the contents.

* * * * *